(12) United States Patent
Raad et al.

(10) Patent No.: US 6,173,974 B1
(45) Date of Patent: Jan. 16, 2001

(54) DETECTING JACKING OR HOISTING OF A VEHICLE HAVING A SUSPENSION SYSTEM THAT INCLUDES GAS LEVELERS

(75) Inventors: Joseph Michael Raad, Southgate, MI (US); George Nicholas Villec, Tucson, AZ (US)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/407,319

(22) Filed: Sep. 28, 1999

(51) Int. Cl.$^7$ .................................................. B60G 17/00
(52) U.S. Cl. ..................................... 280/6.157; 280/5.514; 280/6.159; 280/DIG. 1
(58) Field of Search ............................. 280/5.517, 6.157, 280/6.158, 6.159, DIG. 1

(56) References Cited

U.S. PATENT DOCUMENTS

| | | | |
|---|---|---|---|
| 4,709,934 | 12/1987 | Suzuki et al. | 280/6 R |
| 4,783,089 | 11/1988 | Hamilton et al. | 280/6 R |
| 4,965,878 | 10/1990 | Yamagiwa et al. | 364/424.05 |
| 5,083,454 | 1/1992 | Yopp | 73/118.1 |
| 5,273,308 | * 12/1993 | Griffiths | 280/6.157 |
| 5,286,059 | 2/1994 | Tabe | 280/840 |
| 5,344,189 | * 9/1994 | Tanaka et al. | 280/6.157 |
| 5,466,007 | * 11/1995 | Smith | 280/6.157 |
| 5,484,162 | * 1/1996 | Kanoh et al. | 280/6.157 |
| 5,499,845 | * 3/1996 | Geiger et al. | 280/6.157 |
| 5,652,703 | 7/1997 | Kawazoe | 364/424.046 |
| 5,696,678 | 12/1997 | Raad et al. | 364/424.046 |

\* cited by examiner

Primary Examiner—Kenneth R. Rice
(74) Attorney, Agent, or Firm—Gregory P. Brown

(57) ABSTRACT

An automotive vehicle suspension system includes a respective gas leveler (42) at each of multiple wheels. A compressor (12) and reservoir (46) serve the gas levelers. The compressor has an internal gas compressing mechanism (26) for charging the reservoir, an internal electric-operated exhaust valve (20), and a port (30) through which the gas compressing mechanism and the exhaust valve communicate with the reservoir and gas levelers. A respective branch (32, 34, 36, 38, 40) from each gas leveler and the reservoir to the compressor port contains a respective electric-operated valve (44, 48) in series with the respective gas leveler and reservoir. An electric pressure sensor (50) provides an actual pressure measurement within a range of pressures at a node that is common to the branches and to the compressor port. Apparent hoisting or jacking of the vehicle is detected (FIG. 2) by measuring the ride height at each wheel by means of a respective electric sensor, measuring gas pressure in each gas leveler, and signaling apparent hoisting or jacking by processing the ride height and the gas leveler pressure measured at each wheel and a predetermined load for the wheel. Operation of the gas levelers is inhibited when apparent hoisting or jacking is signaled.

13 Claims, 2 Drawing Sheets

DETECTING JACKING OR HOISTING OF A VEHICLE HAVING A SUSPENSION SYSTEM THAT INCLUDES GAS LEVELERS

BACKGROUND OF THE INVENTION

1. Field of the Invention

This invention relates to automotive vehicles having suspension systems that include gas levelers for adjusting vehicle ride height, and in particular it relates to detecting when such a vehicle is being either hoisted or jacked.

2. Background Information

In certain situations involving a vehicle of the type to which this invention relates, it may be desirable for the vehicle to have a self-diagnostic capability that enables it to automatically detect when it is being hoisted or jacked. Hoisting is customarily considered raising, from above by a device such as a hoist, a portion of a vehicle to relieve some or all of a portion of the vehicle weight applied at one wheel, or at a set of wheels such as the front wheels or the rear wheels. At an extreme, the weight is fully relieved by lifting the wheel, or set of wheels, off an underlying support surface. Jacking is customarily considered raising, from below by means of a device such as a jack, a portion of a vehicle to relieve some or all of a portion of the vehicle weight applied at one wheel, or at a set of wheels such as the front wheels or the rear wheels. At an extreme, the weight is fully relieved by lifting the wheel, or set of wheels, off an underlying support surface.

The suspension system of a vehicle of the type to which the present invention relates includes gas levelers that under certain conditions operate automatically to maintain predetermined vehicle ride heights at the wheels so that the vehicle remains generally level and insensitive to changes in load and/or load distribution within its load carrying capacity. When the vehicle weight applied at one or more wheels is relieved by apparent hoisting or jacking, it may be desirable for the automatic operation of the gas levelers to be interrupted, or inhibited. If a vehicle is equipped with a self-diagnostic capability that automatically detects apparent hoisting or jacking, it can automatically inhibit any vehicle leveling that might otherwise occur if the vehicle were not being apparently hoisted or jacked.

A preliminary novelty search in connection with this invention developed the following U.S. Pat. Nos. 4,709,934; 4,783,089; 4,965,878; 5,083,454; 5,286,059; 5,652,703; and 5,696,678.

SUMMARY OF THE INVENTION

Briefly, a general aspect of the invention relates to a method for self-diagnosing vehicle jacking and hoisting, and a further aspect relates to utilizing this capability to inhibit automatic leveling of a vehicle suspension system.

Other general aspects relate to improving the robustness of a gas suspension system of a motor vehicle and to enhancing the self-diagnostic capability of the system.

The invention comprises an analog pressure sensor that is disposed in the gas system in a manner that enables the sensor to provide gas pressure data at each of the gas springs associated with a respective wheel of the vehicle, gas pressure data at a gas reservoir, and gas pressure data at a gas compressor.

The invention further comprises obtaining measurements corresponding to the portion of the vehicle load that is applied to each wheel, i.e. the corner load proximate each of the four corners of the vehicle. The measurements are compared against reference values indicative of jacking or hoisting to distinguish a condition indicative of vehicle jacking and/or hoisting from a condition indicating neither jacking nor hoisting. If jacking or hoisting is indicated, operation of the gas levelers is inhibited. After jacking or hoisting has ceased, the inhibition due to jacking and/or hoisting detection ceases.

A general aspect of the present invention relates to an automotive vehicle comprising a suspension system that includes a respective gas leveler at each of multiple wheels and a pneumatic circuit that serves the gas levelers and comprises a gas pressure source for introducing gas under pressure into the gas levelers and a gas exhaust for exhausting pressurized gas from the gas levelers, a respective branch from each gas leveler to the gas pressure source and the gas exhaust, including a respective electric-operated valve in series with the respective gas leveler, and an electric pressure sensor that provides an actual pressure measurement within a range of pressures at a pneumatic circuit node that is common to the branches and to gas pressure source.

Another general aspect relates to an automotive vehicle comprising: a suspension system that includes a respective gas leveler at each of multiple wheels; a compressor that serves the gas levelers and comprises an internal gas compressing mechanism, an internal electric-operated exhaust valve, and a port through which the gas compressing mechanism and the exhaust valve communicate with the gas levelers to pressurizing and exhausting the gas levelers; a respective branch from each gas leveler to the compressor port, each branch comprising a respective electric-operated valve in series with the respective gas leveler; and an electric pressure sensor that provides an actual pressure measurement within a range of pressures at a pneumatic circuit node that is common to the branches and to the compressor port.

Still another general aspect relates to a method for detecting apparent hoisting or jacking of an automotive vehicle having a suspension system that includes a respective gas leveler at each of multiple wheels and a pneumatic circuit that operates the gas levelers to set vehicle ride height at each wheel, the method comprising: measuring the ride height at each wheel by means of a respective electric sensor; measuring gas pressure in each gas leveler; and signaling apparent hoisting or jacking by processing the ride height and the gas leveler pressure measured at each wheel and a predetermined load for the wheel.

Further aspects will be seen in the ensuing description, claims, and accompanying drawings.

BRIEF DESCRIPTION OF THE DRAWINGS

The drawings that will now be briefly described are incorporated herein to illustrate preferred embodiments of the invention and a best mode presently contemplated for carrying out the invention.

DESCRIPTION OF THE PREFERRED EMBODIMENT(S)

Figure 1:
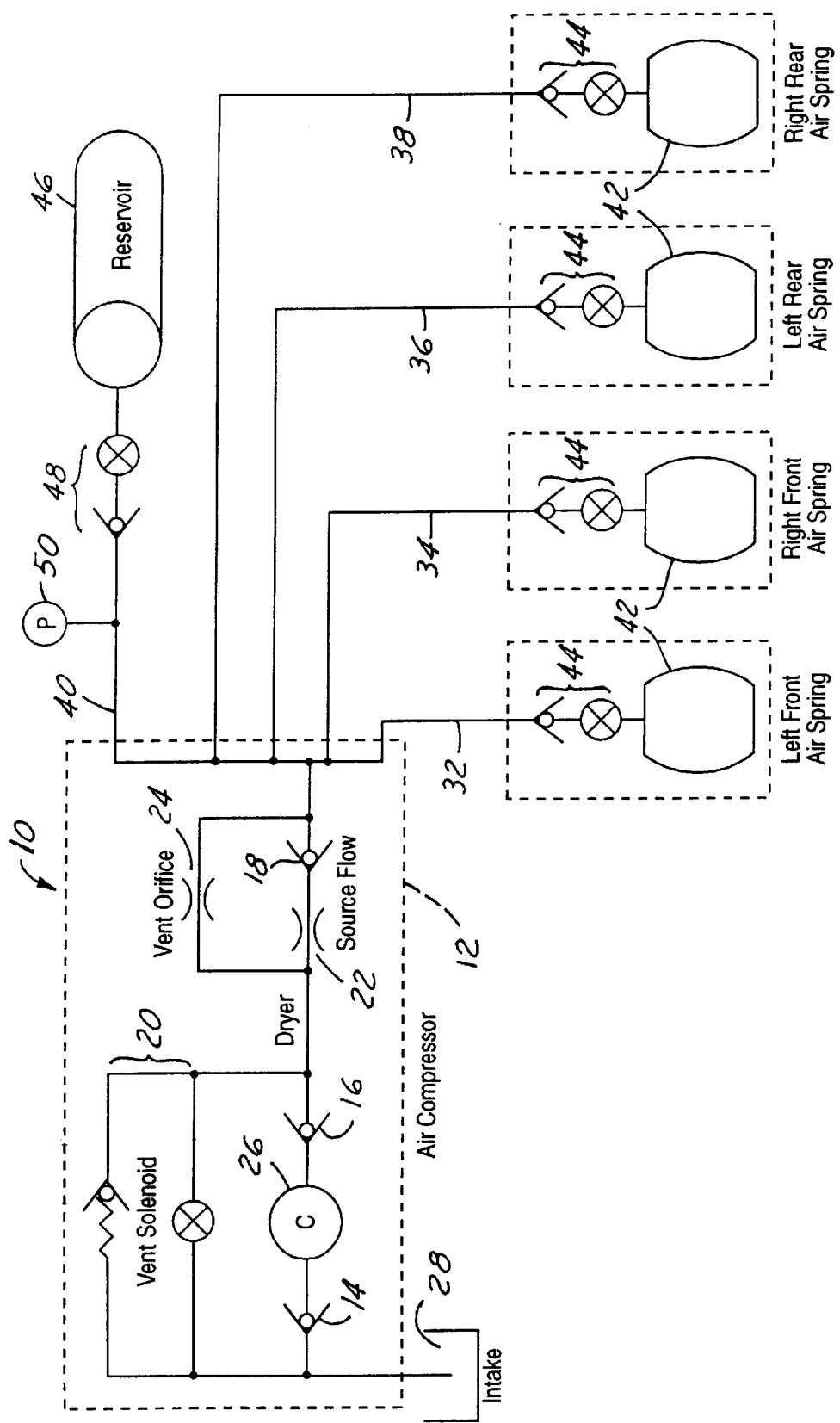
FIG. 1 is schematic diagram of a pneumatic circuit of a gas leveling system of a vehicle suspension system, in accordance with principles of the invention.

FIG. 1 shows a pneumatic circuit 10 of a gas leveling system of a vehicle suspension system according to principles of the present invention. The vehicle suspension system is not shown in detail, but is like the one shown and described in commonly assigned U.S. Pat. No. 5,696,678, Raad et al.

Generally speaking in the case of a four-wheeled automobile that has a set of front wheels and a set of rear wheels, the gas leveling system functions to maintain a predetermined ride height for the vehicle body independent of the actual weight of the sprung vehicle mass acting on the suspension system within load-carrying and load-distribution design parameters of the vehicle. An exemplary suspension system includes, between each wheel and the sprung vehicle mass, an adjustable air spring cooperatively associated with a damper at each of the four corners of vehicle. The gas leveling system also includes an electronic control unit, which may or may not be a devoted unit, that exercises control over gas leveling operation. A ride height sensor is disposed in the suspension system for each wheel to provide a respective electric signal corresponding substantially to the height of the vehicle body above the respective wheel. The electronic control unit receives inputs from various sources, including the ride height sensors at the wheels, and controls the admission of gas into the gas springs and the exhaust of gas from the gas springs. A convenient gas medium is atmospheric air and the following description will on occasion mention air as the medium being employed.

Pneumatic circuit 10 comprises an air compressor 12 representing a known device. It may be powered in an suitable manner such as by an electric motor that obtains current from the vehicle electrical system. Internal to compressor 12 are several pneumatic circuit components indicated by conventional pneumatic symbols. They include one-way valves (i.e. check valves) 14, 16, 18, a solenoid-operated pressure relief valve 20, and orifices 22, 24. The internal gas compressing mechanism of compressor 12 is designated by the numeral 26. Compressor has two ports, an atmospheric port 28 that is communicated to atmosphere, and a system port 30 that is communicated to five branches 32, 34, 36, 38, 40 of the pneumatic circuit.

Each of branches 32, 34, 36, 38 is associated with a respective gas leveling mechanism at the respective vehicle wheel, and comprises a respective air spring 42 and a respective solenoid-operated check valve 44. Each valve 44 is in series flow relationship between system port 30 and the respective air spring 42. Branch 40 comprises an air reservoir 46 and a solenoid-operated check valve 48 which is in series flow relationship between system port 30 and the reservoir. When the respective solenoid of each valve 44 is not being energized by electric current, the valve functions as a check that allows flow into, but not out of, the respective gas spring and/or reservoir. When the respective solenoid of each valve is being energized by suitable electric current, the check element of the valve unseats to allow flow through the valve in either direction.

Hence the circuit has a node that is common to compressor port 30 and all five branches 32, 34, 38, 38, 40, and it is to this node that a pressure sensor 50 is communicated to sense whatever pressure is present there. Sensor 50 is an electric sensor that provides an electric signal indicative of the sensed pressure at the common node. The signal is supplied to the electronic control unit. Sensor 50 is not merely an on-off type pressure switch that assumes one state when pressure is below a predetermined threshold and the other state when pressure exceeds the threshold; rather it is a device that provides an actual pressure measurement within a range of pressures.

Each air spring 42 comprises an expansible and contractible chamber into which air can be introduced under pressure and from which pressurized air can be exhausted. For any particular air spring, expansion by introducing air and contraction by exhausting air are under the control of the electronic control unit acting through pneumatic circuit 10. When an air spring is expanded by the introduction of additional air, it raises the vehicle body in relation to the underlying wheel, and when an air spring is contracted by exhausting air, it lowers the vehicle body in relation to the underlying wheel.

Compressor 12 operates to keep reservoir 46 charged with a supply of compressed air so that when the levelers need to be raised, an adequate amount of compressed air is immediately available from the reservoir without necessarily having to operate gas compressing mechanism 26 of compressor 12.

Figure 2:
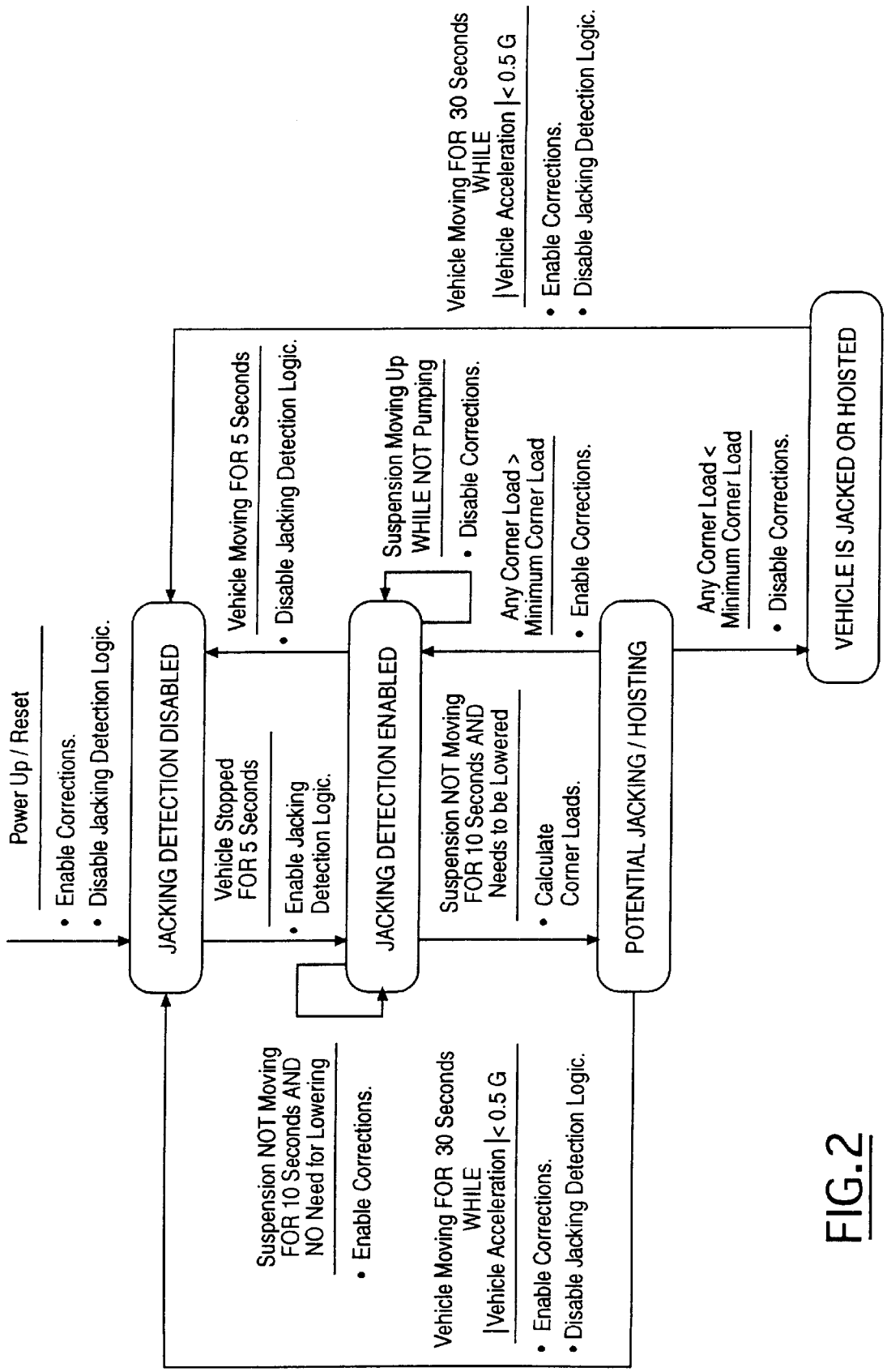
FIG. 2 is a state transition diagram of a method of operating the gas leveling system of FIG. 1 in accordance with principles of the invention.

FIG. 2 is a state transition diagram representing the operational logic of the system, and in the Figure, the phrase marked Jacking Detection should be understood to include both jacking detection and hoisting detection. When electric power is applied to the system at power-up or reset, jacking detection logic is disabled, i.e. inhibited from operating, while vehicle ride heights at the four corners of the vehicle can be corrected, i.e. adjusted. This state is designated Jacking Detection Disabled.

For jacking detection to be enabled, i.e. allowed to operate, the vehicle must be stopped for a predetermined amount of time, for example five seconds. Thus, when the vehicle has been stopped for five seconds, the system state changes from Jacking Detection Disabled to Jacking Detection Enabled. Certain events that may occur while the system is in the latter state are marked in FIG. 2.

Should the vehicle be in motion for a predetermined amount of time, for example five seconds, the system reverts to the Jacking Detection Disabled state. However, should such vehicle motion not resume, the system enables, i.e. allows, the ride heights at the four corners of the vehicle to be corrected, provided that the suspension has not been in motion for a predetermined amount of time, for example 10 seconds, and provided that there is no need for lowering the ride heights at the four corners. The concurrence of these two provisos is interpreted to mean that the vehicle is being neither jacked nor hoisted; and hence the ride height control system is allowed to operate in its usual way.

On the other hand, even in the absence of resumed vehicle motion that would otherwise cause reversion to the Jacking Detection Disabled state, the sensing of upward motion in the suspension system while gas is not being introduced into the gas springs will be effective to inhibit, i.e. disable, operation of the ride height control system. Because the concurrence of such upward motion and of the absence of pumping gas into the gas springs is indicative of potential jacking or hoisting, it is deemed appropriate to inhibit ride height adjustments because of such potentiality.

Apart from reversion to the Jacking Detection Disabled state, the only other possible transition out of the Jacking Detection Enabled State is a transition to the Potential Jacking/Hoisting state. Such a transition will occur if two conditions are satisfied, namely if the vehicle has not been in motion for a predetermined amount of time, for example 10 seconds, and if a ride height correction is needed. In addition to causing the state transition, the satisfaction of those two conditions causes the loads at the four corners of the vehicle to be calculated.

Further calculation causes each calculated corner load to be compared to a respective predetermined minimum corner load. Any calculated corner load that is below the respective predetermined minimum is indicative of the vehicle being jacked or hoisted, and is sufficient by itself to cause the state to change to one that signals that the vehicle is being jacked or hoisted. To the extent that the ability of the system to make ride height adjustments may not have already been inhibited, the signaling of the vehicle being jacked or hoisted is effective to inhibit ride height adjustments.

The system will continue to reside in the state of signaling jacking or hoisting until the vehicle has been moving for more than a predetermined amount of time, for example 30 seconds, and the magnitude of vehicle acceleration has not exceeded a predetermined threshold, for example 0.5 g. (The letter "g" representing the acceleration of gravity.) Once those conditions have been satisfied, the state reverts to the Jacking Detection Disabled state, concurrently enabling ride height adjustments to be made if called for.

Had the system state not transitioned from Potential Jacking/Hoisting to one of signaling jacking or hoisting, the same conditions that caused the system state to change from signaling vehicle jacking or hoisting to the state of Jacking Detection Disabled will cause the system state to revert to the latter and enable ride height adjustments to be made if called for.

Calculation of each corner load is performed by the electronic control unit processing, as input data, the ride height measurement from the respective ride height sensor and a pressure measurement of the pressure in the respective air spring. For the four corners, the electronic control unit contains respective look-up tables, or maps, that correlate various combinations of ride heights and spring pressures to corresponding loads. When particular values of ride height and spring pressure are read at a corner, the corresponding map furnishes a load value corresponding to the ride height and spring pressure values. The processing further includes comparing the load value against a reference for the corner.

A measurement of the pressure in a selected air spring is made by the electronic control unit energizing the corresponding valve 44 to open that valve while all other solenoid-operated valves remain de-energized, and hence closed. In this way only the air pressure in that selected air spring is communicated to pressure sensor 50. The electronic control unit contains the predetermined minimum corner load, i.e. the reference, against which the computed corner load is compared during the processing.

By opening valve 48 while all other solenoid-operated valves remain closed, sensor 50 can measure the pressure in reservoir 46. To the extent that it is not limited by pressure relief valve 20, sensor 50 can measure the pressure of compressor 12 by not energizing any of the solenoid-operated valves while the compressor is running. When the solenoid of valve 50 is not being energized by electric current, the valve functions as a pressure-relief valve that vents excess pressure to atmosphere. When the solenoid is being energized by suitable electric current, the valve elements unseats to allow flow through the valve in either direction.

The system and method that have been disclosed offer important benefits with respect to the air springs, the air reservoir, the air lines, the air compressor, and the solenoid. With respect to the air springs, vehicle and suspension loads can be calculated at each wheel based on suspension height, i.e. ride height, and air spring pressure. The calculations may be furnished to other vehicle sub-systems. When the vehicle is stationary, suspension loads can be used to detect apparent hoisting/jacking and avoid making leveling corrections when hoisting/jacking is detected. Loads exceeding design parameters, maximum gross vehicle weight (GVW) for instance, can be detected and flagged. Leakage from a branch can be detected. The measurement of air spring pressure during a leveling correction may be used to infer a height sensor failure.

With respect to the air reservoir, it becomes possible to predict if the reservoir has sufficient charge to accomplish an anticipated leveling operation without having to operate the compressor. A leaky reservoir can be detected. Temperature changes can be detected by changes in reservoir pressure.

With respect to the air lines that are in the branches from the compressor, their pressure can be measured when all valves are closed. This can distinguish a pre-charged line from a purged one. Air line pressure can be used to determine a desirable time to energize the compressor after purging and a desirable time to energize a solenoid after pre-charging. Leakage from air lines may also be inferred.

With respect to the air compressor, compressor pressure can indicate if the compressor is operating properly, has stalled, or has reached its relief pressure. Degradation in compressor performance may be observed through a history of compressor pressure measurements. These are useful for diagnostic purposes.

With respect to the solenoid-operated valves, air line pressure measurements can detect valves that may become stuck.

While a presently preferred embodiment has been illustrated and described, it is to be appreciated that the invention may be practiced in various forms within the scope of the following claims.

What is claimed is:

1. An automotive vehicle comprising a suspension system that includes a respective gas leveler at each of multiple wheels and a pneumatic circuit that serves the gas levelers and comprises a gas pressure source for introducing gas under pressure into the gas levelers and a gas exhaust for exhausting pressurized gas from the gas levelers, a respective branch from each gas leveler to the gas pressure source and the gas exhaust, including a respective electric-operated valve in series with the respective gas leveler, and an electric pressure sensor that provides an actual pressure measurement within a range of pressures at a pneumatic circuit node that is common to the branches and to gas pressure source.

2. An automotive vehicle as set forth in claim 1 in which the gas pressure source comprises a compressor having a port communicated to the pneumatic circuit node, an internal gas compression mechanism for delivering compressed gas through the port to the node, and the gas exhaust comprises an exhaust valve that is internal to the compressor for exhausting gas from the node through the port, and out of the compressor.

3. An automotive vehicle as set forth in claim 2 in which the exhaust valve comprises an electric-operated pressure relief valve.

4. An automotive vehicle as set forth in claim 1 in which the gas pressure source further comprises a reservoir for storing compressed gas, and an electric- operated valve through which the reservoir is communicated to the node.

5. An automotive vehicle as set forth in claim 4 in which the electric-operated valves comprise electric- operated check valves.

6. An automotive vehicle comprising:
   a suspension system that includes a respective gas leveler at each of multiple wheels;
   a compressor that serves the gas levelers and comprises an internal gas compressing mechanism, an internal electric-operated exhaust valve, and a port through which the gas compressing mechanism and the exhaust valve communicate with the gas levelers to pressurizing and exhausting the gas levelers;

a respective branch from each gas leveler to the compressor port, each branch comprising a respective electric-operated valve in series with the respective gas leveler;

and an electric pressure sensor that provides an actual pressure measurement within a range of pressures at a pneumatic circuit node that is common to the branches and to the compressor port.

7. An automotive vehicle as set forth in claim 6 in which the electric-operated exhaust valve comprises an electric-operated pressure relief valve, and the electric-operated valve in each branch comprises a respective electric-operated check valve.

8. An automotive vehicle as set forth in claim 6 further including a reservoir for storing compressed gas, and an electric-operated valve through which the reservoir is communicated to the pneumatic circuit node.

9. An automotive vehicle as set forth in claim 6 including a further branch from the compressor port comprising reservoir for storing compressed gas and an electric-operated valve through which the reservoir is communicated to compressor port, and in which the electric-operated valve in each branch comprises a respective electric-operated check valve.

10. A method for detecting apparent hoisting or jacking of an automotive vehicle having a suspension system that includes a respective gas leveler at each of multiple wheels and a pneumatic circuit that operates the gas levelers to set vehicle ride height at each wheel, the method comprising:

measuring the ride height at each wheel by means of a respective electric sensor;

measuring gas pressure in each gas leveler;

and signaling apparent hoisting or jacking by processing the ride height and the gas leveler pressure measured at each wheel and a predetermined load for the wheel.

11. A method as set forth in claim 10 in which the gas pressure at each wheel is measured by a common electric pressure sensor that is selectively communicated to each gas leveler.

12. A method as set forth in claim 11 in which the electric pressure sensor is selectively communicated to each gas leveler by selectively operating a respective electric-operated valve through which each gas leveler is communicated to the pressure sensor.

13. A method as set forth in claim 10 further including inhibiting operation of the gas levelers when apparent hoisting or jacking is signaled.

* * * * *